US009584956B2

(12) United States Patent
Saadi et al.

(10) Patent No.: US 9,584,956 B2
(45) Date of Patent: Feb. 28, 2017

(54) METHOD FOR COUNTING STEPS TAKEN BY A USER

(71) Applicant: WITHINGS, Issy les Moulineaux (FR)

(72) Inventors: Rachid Saadi, Plaisir (FR); Ahmed Dahbi, Paris (FR); Cédric Hutchings, Issy les Moulineaux (FR)

(73) Assignee: WITHINGS, Issy lex Moulineaux (FR)

( * ) Notice: Subject to any disclaimer, the term of this patent is extended or adjusted under 35 U.S.C. 154(b) by 0 days.

(21) Appl. No.: 14/674,076

(22) Filed: Mar. 31, 2015

(65) Prior Publication Data
US 2015/0281879 A1 Oct. 1, 2015

(30) Foreign Application Priority Data
Mar. 31, 2014 (FR) .................... 14 52807

(51) Int. Cl.
| | |
|---|---|
| *G01P 3/10* | (2006.01) |
| *H04W 4/00* | (2009.01) |
| *H04W 76/02* | (2009.01) |
| *H04L 1/16* | (2006.01) |
| *G01C 22/00* | (2006.01) |
| *H04M 1/725* | (2006.01) |

(52) U.S. Cl.
CPC .......... *H04W 4/008* (2013.01); *G01C 22/006* (2013.01); *H04L 1/1678* (2013.01); *H04M 1/7253* (2013.01); *H04W 76/023* (2013.01); *H04M 2250/02* (2013.01)

(58) Field of Classification Search
CPC ....... G01C 22/006; G01C 25/00; G01P 21/00; G01D 18/00; G06F 1/163; G06F 19/3481; G06F 3/0484; A63B 24/0062; A63B 71/0622; A61B 5/1118; A61B 5/681; H04L 51/32; H04L 12/58; H04L 51/046; G01S 19/19; H04W 84/18; H04W 4/021; H04W 4/003; H04W 4/02; H04W 76/045
See application file for complete search history.

(56) References Cited

U.S. PATENT DOCUMENTS

| | | | |
|---|---|---|---|
| 2012/0253485 A1* | 10/2012 | Weast | G06F 1/163 700/91 |
| 2013/0325399 A1 | 12/2013 | Yuen et al. | |
| 2014/0171156 A1* | 6/2014 | Pattikonda | H04M 1/7253 455/569.1 |
| 2014/0343885 A1* | 11/2014 | Abrahamsson | G01C 22/006 702/96 |

* cited by examiner

*Primary Examiner* — Thien T Mai
(74) *Attorney, Agent, or Firm* — Miller, Matthias & Hull LLP

(57) ABSTRACT

A method of counting steps of a user employs a first device, e.g. a personal activity monitor 1) and a second device, e.g. a smartphone 2) which communicate with each other. The method includes detecting and counting the steps of the user by the first device, detecting and counting the steps of the user by the second device, transferring step data from one of the two devices to the other of the two devices, and identifying at least a first time period (Tw) for which a difference in the number of steps counted by the first device and by the second device is greater than a predetermined threshold (S). The method further includes supplementing the step data recorded for the first time period in one of the two devices with the step data from the other of the two devices.

12 Claims, 4 Drawing Sheets

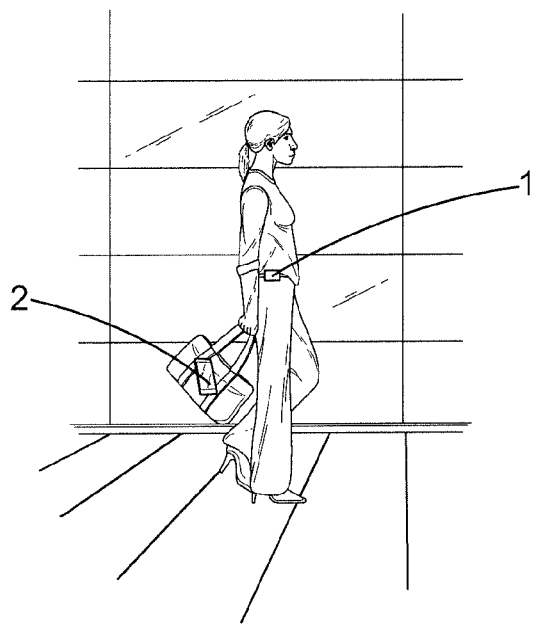
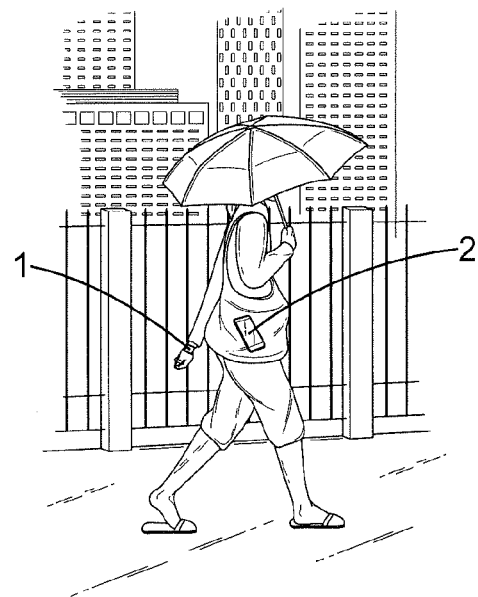
FIG. 1a　　　　　　　　FIG. 1b
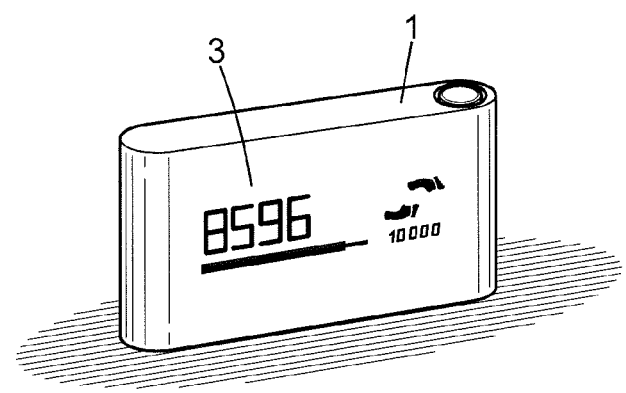
FIG. 2

METHOD FOR COUNTING STEPS TAKEN BY A USER

CROSS-REFERENCE TO RELATED APPLICATION

This application claims priority under the Paris Convention to French Patent Application No. 14 52807 filed on Mar. 31, 2014.

FIELD OF THE DISCLOSURE

The present invention relates to methods for counting steps taken by a user.

BACKGROUND OF THE DISCLOSURE

More particularly, the invention relates to a method for counting steps taken by a user, in parallel by a personal activity monitor and by the step counting function of a smartphone, which can be connected together, to compensate for a possible absence of counting by the personal activity monitor.

Conventional activity monitors which count a user's steps are known (they are also called 'pedometers'), such as those disclosed in US2013 0325399. However, if the activity monitor is forgotten for example or fails (no more batteries for example), the user loses the tracking of his or her activity and the count of the number of steps taken.

In document US2013 0325399, the portable activity monitor is combined with a remote device in order to geolocate the information collected about a user's activity, but this association between a portable activity monitor and a remote device does not compensate for a lack of counting by the monitor.

There is therefore a need for a method with parallel and complementary counting by means of a device wirelessly connected (for example by Bluetooth™) to said activity monitor.

SUMMARY OF THE DISCLOSURE

The invention therefore proposes a method for counting steps taken by a user, said method being implemented by a first portable electronic device formed by a personal activity monitor intended to be rather rigidly associated with the body of the user, and by a second portable electronic device formed by a smartphone, the first and second devices being configured to exchange data over a wireless connection, the method comprising the steps of:
/a1/ detecting and counting the steps of the user, by the first device, with at least one associated timestamp information,
/a2/ detecting and counting the steps of the user, by the second device, with at least one associated timestamp information,
/b/ transferring step data from one of the two devices to the other of the two devices,
/c/ identifying at least a first time period (Tw) for which it is determined that a difference in the number of steps counted by the first device and by the second device is greater than a predetermined threshold (S), which is indicative of an inadequate/inconsistent step count,
/d/ supplementing the step data inadequately recorded for said first time period in one of the two devices, with the step data from the other of the two devices.

With these arrangements, the step count data of one the two devices can be supplemented or corrected by the data collected by the other of the two devices. In addition, the method is symmetrical concerning the two devices and functions regardless of which device has not counted or has only partially counted the steps.

Besides, in preferred embodiments of the invention, one or more of the following arrangements may possibly be used.

In step /a1/ or /a2/, one of the two devices did not count steps at all during said first time period. The method then allows compensating for the fact that one of the two devices was forgotten by the user, or that its battery is in a discharged state.

During said first time period (Tw), the step data were recorded by the second device and not by the first device, and in step /d/ the data of the first device are supplemented with the step data recorded for said first time period (Tw) by the second device. The method can thus compensate for the fact that the user may have forgotten to bring or wear his or her personal activity monitor.

In step /b/ the step count data recorded by the first device are sent to the second device, and in step /c/ the first time period (Tw) is identified by the second device. The comparison calculations are thus performed by the smartphone which has more resources, and the activity monitor does not need to receive and evaluate the data collected by the smartphone.

In step /d/, the step data recorded by the second device for said first time period are transferred to the first device, so that the first device can receive count data for steps it has not counted; in particular, the total number of steps can include steps not initially counted by the first device but counted by the second device to provide redundancy (backup).

The first device comprises a first local clock for time-stamping collected data, and the second device comprises a second local clock for time-stamping collected data, whereby the timestamps for the data collected by the two devices can be referenced to a common absolute time, which allows a reliable comparison at step /c/.

The method may further comprise a step of synchronizing the first local clock with the second local clock, whereby the timestamps for the data collected by the two devices remain consistent and allows the devices to refer to a common time base.

A time base is defined, which comprises a plurality of successive time intervals, preferably rather short e.g. 1 minute or less, and in step /c/ the number of steps respectively counted by each of the two devices for each of the successive intervals are compared, so that a count discrepancy between the two devices can be found very easily and very quickly.

The second device (i.e. smartphone) may contain a "step counting" application configured to be selectively activated when the absence (or inactivity) of the first device near the second device is detected, the first device either actually being absent or its battery being low or dead. The smartphone thus compensates for the absence (or failure) of the activity monitor only when needed, reducing overall power consumption.

The activation of said application may be automatic, whereby the substitutive action of the smartphone is completely seamless and transparent to the user who has no particular action to perform even if the user has inadvertently forgotten the personal activity monitor; the recovery of missing data will be automatic when the connection between the two devices is reestablished.

The application in question can be paused or deactivated when the presence of the first device near the second device is detected, optimizing power consumption at the smartphone when the personal activity monitor is active (in operation).

The predetermined threshold (S) can be defined with respect to the difference between the number of steps (N1) counted by the first device and the number of steps (Nb2) counted by the second device, normalized relative to the largest of the two numbers of steps, the threshold value then preferably being between 0.1 and 0.2. The decision criterion is thus advantageously based on a dimensionless coefficient, a ratio independent of the duration of the time interval ($T_{seq}$, Tw).

The invention also relates to an information system intended for a user, comprising a first portable electronic device formed by a personal activity monitor intended to be rigidly associated with the body of the user, and a second portable electronic device formed by a smartphone, the first and second devices being configured to exchange data over a wireless connection, each of the first and second devices being configured to detect and count the steps of the user, with at least one timestamp information, the system being configured for (/b/) transferring step data from one of the two devices to the other of the two devices, (/c/) identifying at least a first time period ($T_{seq}$) for which it is determined that a difference in the number of steps counted by the first device (1) and by the second device (2) is greater than a predetermined threshold (S), and (/d/) supplementing the step data recorded for said first time period in one of the two devices with the step data from the other of the two devices.

Advantageously, such an information system may implement one or more of the arrangements described above in relation to the method features.

Other features and advantages of the invention will become apparent from the following description of one of its embodiments, given by way of non-limiting example with reference to the accompanying drawings.

BRIEF DESCRIPTION OF THE DRAWINGS

In the drawings:

FIGS. 1a and 1b represent a user carrying an activity monitor and a smartphone,

FIG. 2 illustrates the activity monitor,

In the various figures, the same references designate identical or similar elements.

In FIGS. 1a-1b, a user is carrying a first portable electronic device 1 formed by a personal activity monitor which is associated in a substantially rigid manner with the body of the user.

Figure 3:
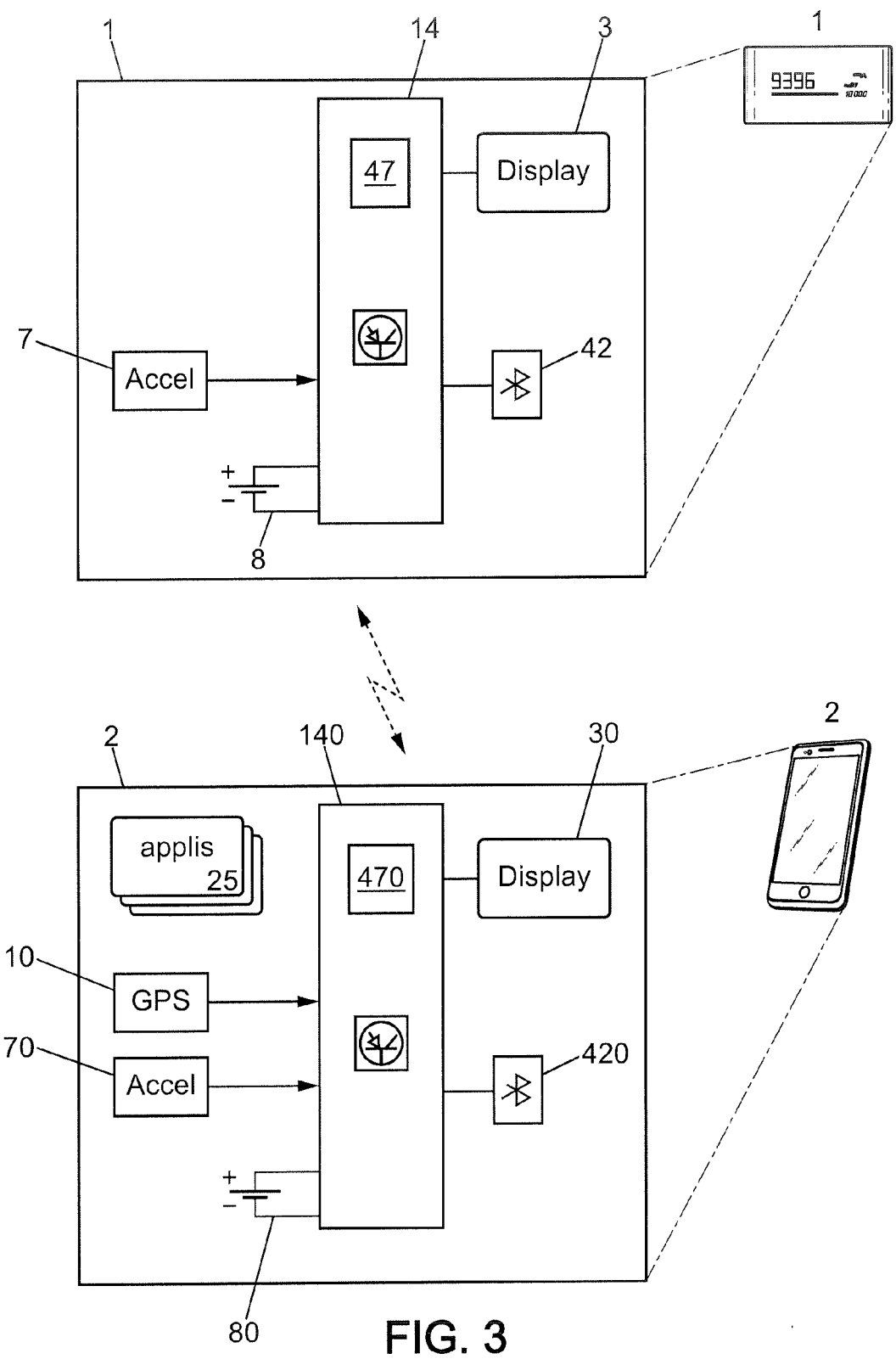
FIG. 3 shows a block diagram of the system formed by the activity monitor and smartphone.

The user is also carrying a second portable electronic device 2 formed here by a smartphone. Said second portable electronic device 2 may, for example, be located in the bag the user is carrying as shown in FIG. 1, or in a pocket, backpack, or elsewhere (i.e. not necessarily associated in a rigid manner to the user's body).

The two devices 1,2 are able to connect and exchange data, preferably via a wireless connection. The wireless connection may be established by Bluetooth™, WiFi, Zigbee, RFID, or any other equivalent interface. Advantageously, in the case of a Bluetooth™ connection, it allows evaluating the distance between the two devices by determining the signal strength and known propagation characteristics.

In particular, the step data collected by one of the two devices can advantageously be combined with the step data collected by the other device. For example, the step data collected by the first device 1 can be combined with the step data collected by the second device 2, or vice versa.

DETAILED DESCRIPTION

Each of the two devices 1,2 comprises an internal clock system.

The first device 1 comprises a first internal clock system that enables the first device to handle a general local clock which is used to timestamp the step data counted at the first device; the first internal clock can be synchronized, from time to time or in case of power interruption, with a distant absolute clock.

Similarly, the second device 2 comprises a second internal clock system that enables the second device to handle a general local clock which is used to timestamp the step data counted at the second device; the second internal clock can also be synchronized with an absolute clock (e.g. a web service).

In the example shown in FIG. 2, the first portable electronic device 1 is in the form of an activity monitor, for example the "Pulse"™ product of the applicant. The activity monitor may be in the form of a small case comprising a display system that displays activity. The activity monitor can be a simple podometer or a more functionally elaborate device. The activity monitor is able to inform the user about his or her physical activity: walking, running, sleeping, climbing stairs, etc.

The first electronic device 1 may also be in the form of some other device incorporating an activity monitor, such as a "Smartwatch"™, or glasses such as "Google glasses"™, an earpiece, a hearing aid, or a smart necklace.

As illustrated, the first electronic device 1 is adapted to be substantially rigid with at least a portion of the body of said user when implementing said method, for example worn on the user's belt (see FIG. 1a), or on a strap attached to the user's wrist (see FIG. 1b). It may be integrated into a device worn or carried by the user, in an earpiece, in a hearing aid.

The second portable electronic device 2 takes the form of an intelligent mobile phone known as a smartphone, having a "step counting" application 25. The "step counting" application 25 may be a basic feature included in the lower layers of the operating system (such as Android™ or iOS™ or the like), or may be a feature included in a higher level application accessible to the user. The second device 2 may also be in the form of a tablet, phablet, mini PC, or PDA.

As illustrated in FIG. 3, said first device 1 comprises a processing unit 14. A multi-axis accelerometer connected to the processing unit 14 allows detecting accelerations experienced by the device, from which accelerations of the user are estimated. The acceleration information can be used to estimate (upon filtering) the number of steps taken by the user (step /a1/ of the method).

The first device 1 comprises a display 3 configured to provide the user with a plurality of information, particularly a count of the steps taken. Resetting this counter can occur daily or at some other time, depending on the configuration specified by the user.

The processing unit 14 controls the display 3. It also communicates via a Bluetooth™ communication interface 42.

The processing unit 14 processes the data via a processor that comprises memory 47 and which manages in said memory the data directly measured by the first device 1 or for example received from another device such as the second electronic device 2.

The processing unit 14 also communicates via Bluetooth to send data collected by the first device 1, for example to the second device 2. The processing unit 14 comprises a local clock, generally in line with the absolute time prevailing at the concerned time zone, for the purpose of time-stamping data.

The processing unit 14 is powered by an embedded power source 8, for example a rechargeable battery. This battery powers all elements embedded in the device: the accelerometer 7, the display 3, and the processing unit 14.

As is also illustrated in FIG. 3, said second device 2 also comprises a processing unit 140.

Said second device 2 may, for example, comprise a multi-axis accelerometer 70 connected to the processing unit 140 to detect accelerations experienced by the device, from which accelerations of the user are estimated. The acceleration information can be used to estimate the number of steps taken by the user via said "step counting" application 25 (step /a2/ of the method). Said second device 2 may also comprise a GPS geolocation function with a GPS receiver 10.

Said second device 2 may comprise a number of other applications that can be launched by the user or are continuously running in the background.

The processing unit 140 comprises a display 30 configured to provide the user with a plurality of information, particularly a step counter. Resetting this counter can occur daily or at some other time, depending on the configuration specified by the user. The processing unit 140 controls the display 30.

The processing unit 140 also communicates via a Bluetooth™ communication interface 420. The processing unit 140 comprises a local clock, generally in line with the absolute time prevailing at the concerned time zone, for the purpose of time-stamping data.

The processing unit 140 processes the data via a processor that comprises memory 470 and which manages in said memory the data directly captured by the "step counting" application 25 of the second device 2 or the data received via Bluetooth from another device such as the first device 1.

The processing unit 140 is powered by an embedded power source 80, which powers all elements embedded in the device: the accelerometer 70, the display 30, and the processing unit 140, etc. . . . .

As already mentioned, the first device 1 and second device 2 have each a local clock enabling to time stamp the collected data with current hour/min/sec information.

Optionally, the local clock of the first device can be synchronized to be in line with the absolute time upon reception of time synchronizing signals/messages from the second device 2. This clock synchronization can be repeated once a day for example. For example, the two devices may synchronize their clocks at each Bluetooth connection, or periodically at a certain frequency, upon request after power interruption.

However, it is not excluded that each of first and second devices can synchronize independently its respective clock with reference to a third party absolute clock/time provider.

The user is generally carrying or wearing the first device 1 and the second device 2. However, one of the two devices may be left behind or have a low or dead battery, or the user may prefer to wear one of the two devices during a certain type of activity. When the two devices reestablish their Bluetooth communication (physically approach one another, for example), advantageously according to the invention, the two devices synchronize their data.

In a known manner, the first device 1 regularly sends the user's number of steps to the second device 2 for statistical purposes and for the user to view data on the display 30. This data upload (denoted 21, step /b/ of the method) can be done at every new Bluetooth connection, or according to scheduling logic, for example every five minutes or even more frequently as explained below.

Advantageously according to the invention, the step counting capabilities of the two devices will be exploited to identify when one of the devices has not counted the steps, or has incorrectly counted the number of steps for one or more periods of time.

Specifically, with reference to FIGS. 4-7, by using their local clocks, a common time scale for the two devices is defined that forms a division into $T_{seq}$ base intervals. For each of said base intervals ($T_{seq}$), the data detected and collected by each of the first and second devices are compared. Such comparison requires that the first device transfer the step data to the second device, preferably after the end of each base interval $T_{seq}$. Alternately, if communication is not established, the step data is transferred in a delayed manner as soon as possible. The data transfer from the first device to the second device is called 'data synchronization'.

If one of the two devices determines during said interval $T_{seq}$ a number of steps "well below" the number of steps detected during the same interval $T_{seq}$ by the other device, the number of steps "well below" being zero or non-zero but significantly less than the number of steps detected by the other device, the data for the number of steps "well below" for interval $T_{seq}$ is considered incorrect and will be corrected.

The number of steps counted by the first device 1 is denoted Nb1 and the number of steps counted by the second device 2 is denoted Nb2. The absolute value of the difference Nb1−Nb2 is denoted Delta, in other words Delta=≥Nb1−Nb2|.

Advantageously, this difference will be directly or indirectly compared with a predetermined threshold (step /c/ of the method).

For example, the smallest value will be declared incorrect if the difference Delta exceeds a fixed threshold.

Advantageously, a dimensionless number is defined representing the discrepancy, normalized relative to the largest value Nb1, Nb2, as follows:

$$DeltaN = \frac{|Nb1 - Nb2|}{\text{Max}(Nb1, Nb2)}$$

DeltaN is therefore the difference between the number of steps (denoted Nb1) counted by the first device 1 and the number of steps (denoted Nb2) counted by the second device 2, normalized relative to the larger of the two numbers of steps.

Advantageously, DeltaN is compared to a predetermined threshold (S).

The predetermined decision threshold S may be a value between 0.1 and 0.2 for example.

If DeltaN>S then the difference is significant and a correction is made, otherwise if DeltaN<S, the difference is not significant and does not result in a correction (this tolerates some difference in the count to avoid making repeated unnecessary corrections).

The time period during which one of the two devices was counting, while the other device did not or has provided an incorrect count of the number of steps, may include several consecutive intervals $T_{seq}$.

In the illustrated figures, said period is bounded by times $T_{100}$ and $T_{200}$ and will be called the "first time period" Tw.

An interval $T_{seq}$ has a duration for example of between 15 s and 300 s, preferably between 30 s and 120 s, typically 60 s. FIGS. 4 to 7 illustrate the case where the period $T_{seq}$ is 30 s.

If, at the time of a data synchronization between the first device 1 and second device 2, a time period is identified of one or more intervals $T_{seq}$ where no data was collected by one of the two devices, the data from the device having counted within that time period will be used for reinjection (step /d/ of the method) into the data of the device that did not provide a count for this period. This corrects the missing or incorrect count of the one of the two devices (typically left behind by the user).

Figure 4:
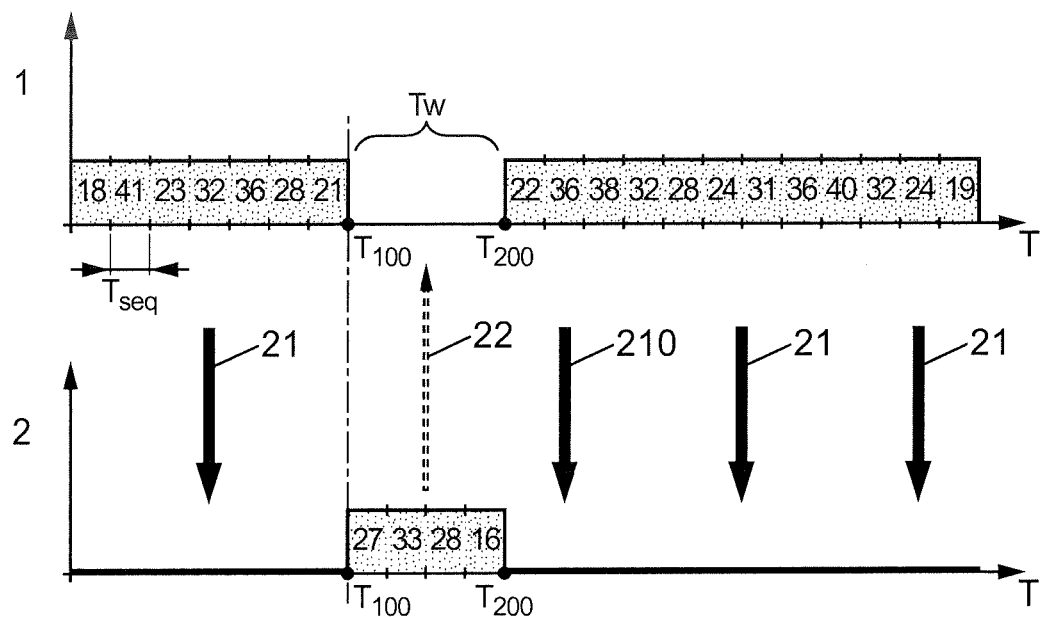
FIG. 4 represents a timing diagram illustrating the operation of the invention in a first embodiment.

According to one embodiment illustrated in FIG. 4, if the user goes out without his or her activity monitor 1, the user is only carrying the second portable electronic device 2. Said second device 2 can then count the steps of the user via the "step counting" application 25 of the second portable electronic device 2.

For example, when the second device 2 moves away from the first device 1, the "step counting" application (or task) 25 of the second device 2 is automatically launched/activated when the absence of the first device 1 near the second device 2 is detected (one can say that the smartphone 'takes over' for the activity monitor when the Bluetooth connection is lost), at time $T_{100}$.

Similarly, the "step counting" application 25 is paused or deactivated when the presence of the first device 1 near the second device 2 is detected. More specifically, the "step counting" application is, for example, paused when the first device 1 is once again counting the detected steps and is in communication with the second device 2 at time $T_{200}$.

When the two devices are again communicating by Bluetooth™, both devices synchronize their data (denoted 210), in particular the activity monitor uploads step count data.

The second device 2 then performs a comparison of the step data collected by the first device 1 to the data collected by the second device 2 over the previous time intervals.

The second device 2 thus identifies, after the fact, a time period Tw, between times $T_{100}$ and $T_{200}$, of one or more intervals $T_{seq}$ during which the "step counting" application 25 of the second device 2 detected step data that were not detected by the first device 1.

For example, for the first interval $T_{seq}$ after $T_{100}$, Nb1=0 and Nb2=27; for the second interval Nb1=0 and Nb2=33; for the third interval Nb1=0 and Nb2=28; and for the fourth interval Nb1=0 and Nb2=16; therefore DeltaN=1 for each of the four aforementioned intervals, a value greater than the predetermined threshold S which therefore triggers a data correction. In this case, the arrow labeled 22 illustrates the step of reinjecting data counted by the smartphone 2 into the activity monitor 1, which can then update its data, particularly the daily total number of steps.

More generally, it is for example when transferring data from one device to another, that the device dedicated to this task identifies the time period Tw between times $T_{100}$ and $T_{200}$ where step data were indeed recorded by one of the two devices and not by the other.

Figure 5:
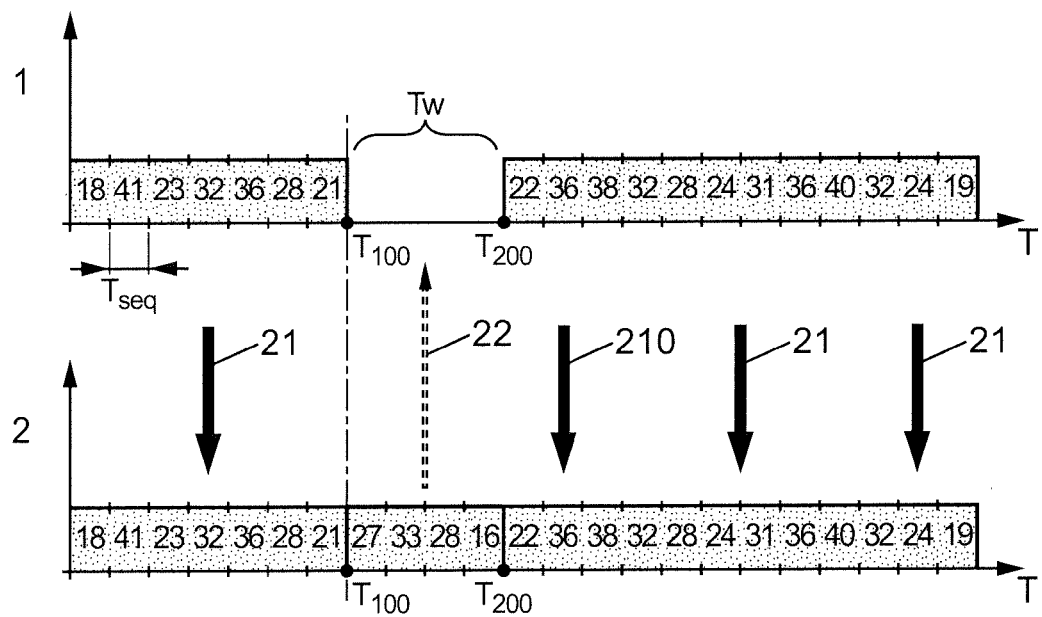
FIGS. 5 to 7 illustrate timing diagrams similar to the one in FIG. 4 but for different cases.

In a variant illustrated in FIG. 5, the "step counting" application 25 of the second device 2 runs continuously in the background with its own resources. In addition, the second device 2 continuously collects the step data obtained by the activity monitor 1 (regular uploads 21), and can compare these data with the count data that it has itself recorded with its own "step counting" application.

Alternatively, the "step counting" application 25 can be started manually by the user when the user realizes that he or she has left the first device 1 behind (conventional pedometer application).

In this embodiment, the second device 2 detects and counts the user's steps, for each interval $T_{seq}$ of the common time scale shared by the first device 1 and second device 2.

Figure 6:
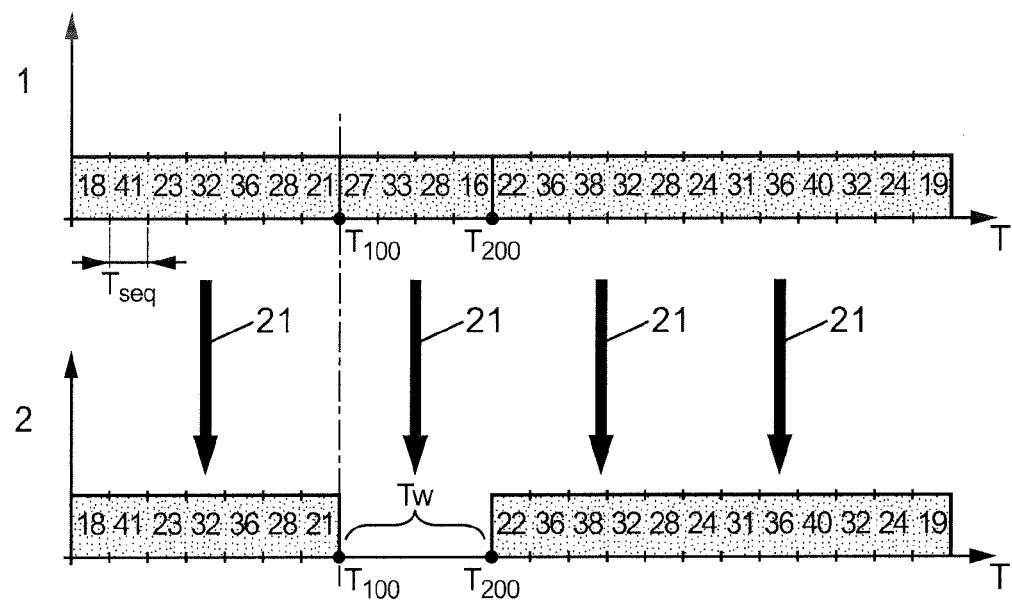

In a variant illustrated in FIG. 6, we consider the opposite situation to FIG. 4, where the second device 2 was left at home or the batteries of the second device 2 are dead or too low.

In this embodiment, the first device 1 detects and counts the user's steps for each interval $T_{seq}$ of the common time scale shared by the first device 1 and second device 2.

When the two devices establish a Bluetooth communication, the devices synchronize their data. The first device 1 transfers its data to the second device 2 which for example lacks these data because it was without battery power for example during period Tw.

The second device 2 can later perform a comparison of step data collected by the first device 1 to the data collected by the second device 2. The second device 2 identifies a time period between times $T_{100}$ and $T_{200}$ of one or more intervals $T_{seq}$ during which the first device 1 detected step data not detected by the "step counting" application 25 of the second device 2.

The second device 2 can thus supplement the data in its own step counting application (step /d/ of the method).

Figure 7:
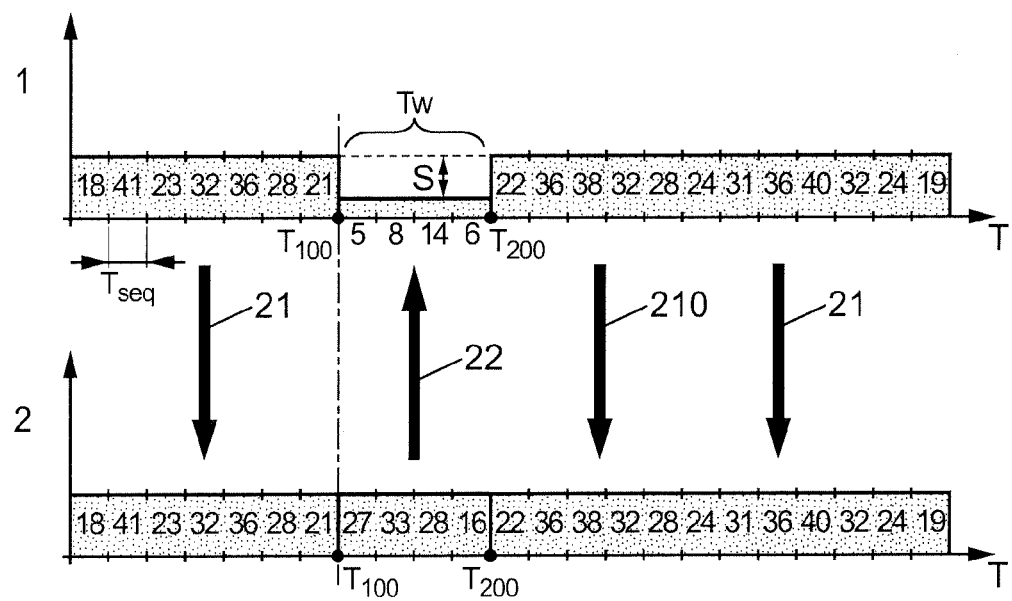

As a variant illustrated in FIG. 7, the user is equipped with two devices 1,2, but one of the two devices is ineffective, either because it has no batteries or because it provides an incorrect count. This is, for example, the case if the device is carried in a location inappropriate for counting steps. The other device then performs the count and the invention works as described above.

For example, the first device 1 is in the user's handbag, and thus may have provided an incorrect count. The data collected by the first device 1 are compared with the data collected by the second device 2. If there is a discrepancy in the number of steps normalized relative to the highest count greater than the predetermined threshold (S) over a period of at least one interval $T_{seq}$, the count obtained by the first device 1 is considered to be incorrect for that time period between times $T_{100}$ and $T_{200}$.

For example, if the difference normalized relative to the highest count is greater than the predetermined threshold (S) of 0.1, the number of steps counted by the first device 1 during said period is considered to be incorrect.

In this case, as shown for the first interval $T_{seq}$ after $T_{100}$, Nb1=5 and Nb2=27; for the second interval, Nb1=8 and Nb2=33; for the third interval Nb1=14 and Nb2=28 (DeltaN=0.5); and for the fourth interval Nb1=6 and Nb2=16 (DeltaN=0.625); therefore DeltaN>S for each of the above four intervals.

The data of the second device 2 within this time period will be used for reinjection (22) into the data of the first device 1 in order to complete the data of the first device 1, in particular for displaying a true total count for the user.

Alternatively (not shown in the figures), the data collected by the second device 2 could be sent to the first device 1 and the first device 1 would identify the time period during which the "step counting" application 25 of the second device 2 detected step data that were undetected or incorrectly detected by the first device 1.

Note that in general, in the case of data collected simultaneously by the first device 1 and by the second device 2, one of the devices can compare the data and assess the reliability of the data collected by both of the devices.

Advantageously, physical proximity between the first device 1 and second device 2 can stop or pause the operation of the "step counting" application 25 of the second device 2. In this case, the second device 2 is exclusively used for the data collected by the first device 1 being transferred to it for processing.

An additional display on the second device 2 may be provided and/or configuration management by an application of the second device 2 related to the first device 1.

Note that when the first electronic device 1 and the second electronic device 2 are with the user, priority is given to using the first electronic device 1 over the second electronic device 2 for tracking user activity. The activity monitor is a device dedicated to counting steps and is generally more accurate than the step counting application of a smartphone.

The activity monitor 1 shown here weighs less than 10 grams, preferably less than 8 grams. Its dimensions are especially small, the thickness being no more than 8 mm, the width no more than 43 mm, the height no more than 22 mm, so that it is particularly unobtrusive when worn.

It should also be noted that the user could carry more than one device having a role of activity monitor, for example two or three devices, such as a hearing aid, "Google glasses"™, and a smart bracelet. In this case, the comparison method described above may involve the comparison of all the data provided by the plurality of devices acting as activity monitor, for example three sets of step data respectively collected by each device and sent to the smartphone. Said smartphone can then identify data to be corrected and can reinject missing data into any of the devices acting as activity monitor.

The invention claimed is:

1. A method for counting steps taken by a user, said method being implemented by a first portable electronic device formed by a personal activity monitor intended to be rather rigidly associated with the body of the user, and by a second portable electronic device formed by a smartphone, the first and second devices being configured to exchange data over a wireless connection, the first device comprising a first local clock for time-stamping collected data, and the second device comprising a second local clock for time-stamping collected data, the method comprising the steps of:
 /a1/ detecting and counting the steps of the user, by the first device, with at least one associated timestamp information, from the first local clock
 /a2/ detecting and counting the steps of the user, by the second device, with at least one associated timestamp information, from the second local clock
 /b/ transferring step data from one of the two devices to the other of the two devices,
 /c/ identifying with the help of the first and the second time stamp information at least a first time period (Tw) for which it is determined that a difference in the number of steps counted by the first device and by the second device is greater than a predetermined threshold (S),
 /d/ supplementing the step data recorded for said first time period in one of the two devices, with the step data from the other of the two devices.

2. The method according to claim 1, wherein in step /a1/ or /a2/, one of the two devices did not count steps during said first time period.

3. The method according to claim 2, wherein during said first time period, the step data were recorded by the second device and not by the first device, and wherein in step /d/ the data of the first device are supplemented with the step data recorded for said first time period (Tw) by the second device.

4. The method according to any claim 1, wherein in step /b/ the step count data recorded by the first device are sent to the second device, and wherein in step /c/ the first time period (Tw) is identified by the second device.

5. The method according to claim 3, wherein in step /d/, the step data recorded by the second device for said first time period are transferred to the first device.

6. The method according to claim 1, further comprising a step of synchronizing the first local clock with the second local clock.

7. The method according to claim 1, wherein a time base is defined that comprises a plurality of successive time intervals (Tseq), and in step /c/ the number of steps (Nb1, Nb2) respectively counted by each of the two devices for each of the successive intervals is compared.

8. The method according to claim 1, wherein the second device (2) contains a "step counting" application configured to be selectively activated when the absence of the first device near the second device (2) is observed.

9. The method according to claim 8, wherein the activation of said application is automatic.

10. The method according to claims 8, wherein the application is paused or deactivated when the presence of the first device near the second device is detected.

11. The method according to claim 1, wherein the predetermined threshold (S) is defined by the difference between the number of steps (Nb1) counted by the first device and the number of steps (Nb2) counted by the second device, normalized relative to the largest of the two numbers of steps, the threshold value then preferably being between 0.1 and 0.2.

12. An information system intended for a user, comprising a first portable electronic device formed by a personal activity monitor intended to be integrally associated with the body of the user, and a second portable electronic device formed by a smartphone, the first and second devices being configured to exchange data over a wireless connection, the first device comprising a first local clock for time-stamping collected data, and the second device comprising a second local clock for time-stamping collected data, each of the first and second devices being configured to detect and count the steps of the user, with at least one item of timestamp information, from each of the first and the second local clock respectively,
 the system being configured for (/b/) transferring step data from one of the two devices to the other of the two devices, (/c/) identifying with the help of the first and the second time stamp information, at least a first time period ($T_{seq}$) for which it is determined that a difference in the number of steps counted by the first device and by the second device is greater than a predetermined threshold (S), and (/d/) supplementing the step data recorded for said first time period in one of the two devices with the step data from the other of the two devices.

* * * * *